United States Patent
Code et al.

[11] Patent Number: 5,860,330
[45] Date of Patent: Jan. 19, 1999

[54] DEVICE FOR HOLDING ONE'S FOOT AT AN ANGLE

[76] Inventors: Keith Code, 255 Harlow Dr., Glendale, Calif. 91206; David Gordon, P.O. Box 4388, Big Bear City, Calif. 92315

[21] Appl. No.: 603,309

[22] Filed: Feb. 20, 1996

Related U.S. Application Data

[60] Provisional application No. 60/008,197 Aug. 28, 1995.

[51] Int. Cl.⁶ .................................................. G05G 1/14
[52] U.S. Cl. ............................................ 74/594.6; 36/131
[58] Field of Search ................................ 74/594.4, 594.6; 36/29, 131, 132

[56] References Cited

U.S. PATENT DOCUMENTS

| | | |
|---|---|---|
| 610,175 | 9/1898 | Flindall . |
| 4,078,322 | 3/1978 | Dalebout ................................ 36/117.4 |
| 4,377,952 | 3/1983 | Gamondes ............................ 74/594.6 |
| 4,407,079 | 10/1983 | Chiroff . |
| 4,449,308 | 5/1984 | Schur . |
| 4,488,453 | 12/1984 | Drugeon et al. . |
| 4,599,915 | 7/1986 | Hlavac et al. ......................... 74/594.4 |
| 4,704,809 | 11/1987 | Ballard . |
| 4,827,633 | 5/1989 | Feldstein . |
| 4,864,887 | 9/1989 | Rapisarda . |
| 4,875,683 | 10/1989 | Wellman et al. . |
| 4,899,618 | 2/1990 | Christol . |
| 4,945,659 | 8/1990 | De Marchi et al. ................... 36/117.5 |
| 5,079,968 | 1/1992 | Starner . |
| 5,105,683 | 4/1992 | Mercat . |
| 5,131,291 | 7/1992 | Beyl . |
| 5,199,192 | 4/1993 | Kilgore . |
| 5,363,573 | 11/1994 | Kilgore . |
| 5,377,561 | 1/1995 | Danieli . |

OTHER PUBLICATIONS

Advertisement from VELONEWS dated Mar. 13, 1995 (p. 35) Copy of fax from Marin Independent Journal dated Sep. 25, 1988.
Informational Sheet from Dr. Hlavac Advertisement from "WINNING" Bicycle Racing Illustrated Mar. 1990.
Advertisement from Excel Sports Boulder (p. 19) Summer 1995.
Advertisement from VELONEWS dated May 8, 1995 (p. 10).

*Primary Examiner*—Rodney H. Bonck
*Assistant Examiner*—Saúl J. Rodriguez
*Attorney, Agent, or Firm*—Ladas & Parry

[57] ABSTRACT

A canting device adjusts the angle of a shoe and/or a pedal in an upward and inward direction to position a bicyclist's foot to maximize the muscle power to be applied by the foot. The device has a tapered thickness and in one instance, is inserted between the sole of the shoe and a cleat, the larger of the tapered thickness being positioned toward the inside of the foot.

13 Claims, 13 Drawing Sheets

DEVICE FOR HOLDING ONE'S FOOT AT AN ANGLE

CROSS-REFERENCE TO RELATED APPLICATION

The present disclosure is based upon and claims priority to U.S. Provisional Application Ser. No. 60/008,197 filed on Aug. 28, 1995. That application is incorporated herein by reference.

FIELD OF THE INVENTION

This invention relates to the field of devices for physical body alignment, and in particular, devices which provide a physical body alignment of the feet when the feet are used to provide power, such as in bicycling.

BACKGROUND

Those involved in physical fitness and competitive physical activity, in conjunction with medical professionals, recognize the importance of proper body alignment during any form of physical exertion. Proper body alignment makes all motion more efficient by focusing the energy in the desired direction and eliminating wasted motion. Further, proper body alignment reduces the stress and strain on the body caused by repetitive misaligned motion.

The foot, in its most naturally relaxed position, is not flat footed. For example, if a person takes the weight off of the foot, it has been found that it cants up to various degrees on the inside. It is well known that flat-footed people can develop knee problems since the leg becomes out of alignment when the ankle is unnaturally twisted and the knee has to twist to compensate for this situation.

Many sporting activities involve repetitive forceful exertion of energy through the legs and feet, for example, in bicycling and skiing. Bicycling requires that the foot be attached to some apparatus, such as a pedal on the bicycle, that is used in the translation of human energy (i.e., muscle power) into forward motion. However, it has been recognized that when the foot is attached to a flat surface, the leg is forced into an unnatural position. An observation of the foot in its natural state reveals that it prefers to be in an angled position with the inside of the foot higher than the outside. When the foot is forced to be flat it causes a misalignment of the entire leg, from the ankle, through the knee to the hip joint.

Many serious bicycle riders wear bicycle shoes which have a cleat which is attachable to the bicycle shoe. Many modern day bicycle pedals provide a coupling device for the cleat to snap in very positively to the pedal. This cleat/pedal combination provides the ability for the rider to not only push down but to also pull up without his foot in the shoe coming off the pedal unless he specifically twists the cleat out of the coupling device. The twist out process enables the cleat to be released from the pedal, for example, if the rider needs to jump off the bicycle in the event of a crash.

There are various styles and shapes of cleats which affix to the bicycle shoe, each cleat typically having holes therethrough to allow the cleat to be attached to the shoe, such as by screws which engage a series of threaded holes which are formed into the sole of the shoe. Each of the various styles of cleats do exactly the same thing, namely, they clamp onto the pedal coupling device arrangement, as basically a spring trap-like mechanism that holds the shoe in place so that the bicyclist does not lose his footing on the pedal. When a bicyclist uses presently known shoe/cleat/pedal attachment devices, misalignment inherently occurs, essentially rendering the bicyclist's relationship to the pedals a flat-footed one. There are several ramifications of this misalignment for the bicyclist. First, the pedaling motion is made less efficient because less power is being delivered to the pedal since misalignment in any power delivery system causes a loss of power delivered to its final intended point. Second, the strain on the joints via tendons, ligaments and muscles is increased. Finally, the knees tend to wobble from side to side on the up and down or forward and back strokes, a further indication that an out-of-alignment situation exists with its resulting decrease in power delivery. It therefore becomes more difficult, due to these losses and strain, to apply muscle power by the foot to the pedal. And, it is particularly more difficult to pedal the bicycle at higher speeds, such as in bicycle racing conditions.

Orthotic devices have been developed to attempt to remedy problems of foot misalignment and custom made and production orthotic devices have been developed for use in the field of bicycling. However, such orthotic devices are limited to the alignment of the bicyclist's foot from the instep rearward to the heel in a neutral position. Orthotic devices do not affect the forefoot and indeed only extend from the bicyclist's heel forward to just past the arch of the foot. While these devices do place the foot from the ball to the heel in its natural position, they do not affect the position of the forefoot. It is, however, through the forefoot (i.e., the ball of the foot) that the bicyclist delivers his power. In fact, the attachment of a bicycling shoe to a pedal is standardly made under the ball of the foot. A discontinued commercially available device made by Marresi shoes of Italy, is a shoe wedge built into the extreme forward position on the sole. It was to be used in conjunction with the old toe clip and toe strap systems. The wedge was non adjustable and angled the foot such that the inside of the foot was forced to be in a lower position than the outside of the foot. However, when the foot was placed on the pedal of the era, the ball of the foot was ultimately in a flat position.

Custom foot bed designs placed inside the bicyclist's shoe have also been made in an attempt to improve foot pedaling efficiency. While these custom foot bed designs are intended to improve the bicyclist's power delivery to the pedals and increase comfort, they are not intended to change the angular position of the forefoot. Their effect is limited to changing angular positions of the heel and ankle relative to the sole of the foot. Some commercially available devices are the DIADORA POWER BED (trademark) and SUPERFEET (trademark) both of which are custom molded footbeds for users. The latter is intended for use in skiing and bicycling while the former is for bicycling only.

Other approaches involve shoes which are contoured to the feet. However, these approaches merely attempt to address the problem of supporting the foot in the shoe, e.g., adding arch support. Such support does not address the problem of the foot being held down in an unnatural position, i.e., locked flat on the pedal.

Another approach which attempts to improve foot pedaling efficiency, involves a rotational pedal system wherein a pedal/shoe/cleat combination provides what is known as "float". The BIO-CLEAT II (trademark) pedal system and the TIME BIOPERFORMANCE (trademark) pedal systems, among others, give the shoe/cleat a certain amount of rotation on the pedal to compensate for misalignment of the ankle, knee and hip when forced into the unnatural situation of the foot/shoe being attached to the pedal. However, these "floating" pedal systems are merely an attempt to cure the symptom rather than the cause in that these systems merely allow the hip, knee, ankle and foot to oscillate while the bicyclist completes each 360° rotation of the pedals following the abnormal positioning and ensuing movement of the foot.

In the field of downhill skiing, a rather primitive and then sophisticated canting mechanism was once used. In an attempt to keep a flat ski for the skier, the age-old practice was to place a flat wooden popsicle stick between the toe and heel of the ski bindings and the ski. Thus, the stick extended along the length of the foot to cant the inside portion of the foot upwardly to counteract the effect of the ski boot and inward pronation by the individual. The hoped-for effect of this was to cause the ski to be in a flattened position to equalize the ability to turn in any direction. It was also believed to deter catching ski edges when skiing, and to prevent riding the edge of the ski. The stick was thought to enhance the skier's control of the skis and therefore, the ability to ski well.

Subsequently, sophisticated metal and plastic wedges were manufactured to be used instead of popsicle sticks. These wedges required a professional to fit them to the user and then to install them between the ski binding and the ski to lie along the foot length and bias the inside portion of the foot upwardly. The wedges were adjusted to counteract the undesirable canting brought about by the ski boot for that particular wearer and to counteract undesirable pronation tendencies of the user. Today, with ski boots being adjustable along numerous planes to cant the foot in various different and combined directions, this age-old system is seldom used. The boots are better able to adjust the foot cant to attend to various issues than the stick and the wedges, and the boots can be adjusted by the user without the need of a professional or amendment of the ski by a professional. Of course, the concerns of a skier are not those of a bicyclist, tennis player, walker or other shoe user. For the bicyclist, the positioning of the body and legs with respect to a bicycle pedal when riding differ significantly from the positioning of the body and legs with respect to a ski when skiing. The same can be said for a runner, tennis player, and walker. Necessarily, different muscles are used in different ways and are affected by different equipment used in the sport and the base or terrain on which the equipment is used. A device that maximizes one's power and control in one sport does not necessarily do so in another. In particular, the bicyclist is largely interested in affecting the ball of the foot as opposed to the entire length of the foot. With a skier, affecting primarily the ball of the foot to the exclusion of the remainder of the foot could worsen one's ability to practice the sport.

Finally, there is available an orthotic pedal device BIO-PEDAL (trademark) designed by Dr. Harry Hlavac and Mr. B. Koski of Marin County, Calif. This pedal is an adjustable orthotic device constructed in three planes for angling the foot when placed thereon and is disclosed in U.S. Pat. No. 4,599,915 for use with bicycles including toe straps. Orthopedic devices, outside wedges and lifts connected to the shoe, according to the inventors, are not viable devices because of the tight fit of the shoe, their positioning in the arch and heel areas, and their potential for interfering with the cleat mechanism of the shoe. Accordingly, these inventors have invented an adjustable pedal that can be lifted; pivoted about a radial axis perpendicular to the axis of the shaft to provide toe-in, toe-out positions; tilted about that same axis to provide inverted and everted foot positions; and set in a fixed position with respect to the shaft. The device is best adjusted after consultation with a podiatrist or other specialist to attend to the specific needs of the user. In 1988, the device sold for $170 and an evaluation of one's particular needs to properly adjust the pedal was available through Biolab in Mill Valley, Calif. for $150.

In view of the foregoing, a need exists for a simple method and apparatus that permits the foot to be in its natural position when engaging in activities that require it to be attached to a device that, generally, would otherwise force the foot into a flat and unnatural position, such as a bicycle pedal. In particular, there is a need for a method and apparatus that permits the front part of the foot to be in its natural position, namely a method and apparatus that ensures that the foot and leg will be properly aligned when muscle power is applied by a bicyclist through his legs into the pedal, thereby improving the efficiency of his power delivery. There is also a need for a device of this nature which can be used for professional bicyclists and hobbyists, which is: inexpensive, may be used by the user without the need of a professional evaluation, and may be used on old and new model bicycles and professional and non professional shoes used for biking.

SUMMARY OF THE INVENTION

One aspect of the invention is an apparatus for exclusively angling the foot such that the inner portion of the foot is canted to a higher level than the outer portion.

In accordance with the present invention a method and apparatus is provided for physical body alignment of a foot applying muscle power by the foot in a desired direction perpendicular to a plane at the ball of the foot to a means for receiving applied muscle power. Means for canting the plane at the ball of the foot through an angle upward and to the inside of the foot from a plane through the means for receiving applied muscle power is inserted between the ball of the foot applying the power and the means for receiving applied muscle power.

In a preferred embodiment, a cant plate in the form of an angled cant plate spacer is inserted between a shoe and a cleat. The cant plate spacer is affixed to the sole of the shoe and is specifically designed to affect the forward position of the foot, from the arch to the toes, thus creating the desired angle between the bicyclist's foot and the pedal. The cant plate spacer thickness is tapered such that the thicker part of the taper is toward the instep side of the shoe while the thinner part of the taper is toward the outer side of the shoe. When the cant plate spacer is inserted between the cleat and the shoe, instead of the rider's foot being flat footed to the pedal arrangement, it is now canted up on the inside. The cant plate spacer of the present invention thereby compensates and provides for the natural cant of the foot.

The use of a cant plate spacer is believed to allow the bicyclist to apply maximized muscle power without the losses associated with oscillation of the hip, knee and ankle that accompany bicycling with the forefoot placed in a flat position, this flat position being the present standard in all present bicycle shoe, bicycle cleat and bicycle pedal systems. The cant plate spacer as described in this invention in its simplest form is wedge-shaped and is designed to be located in a fixed position under the bicyclist's shoe between the shoe sole and the shoe cleat. The degree of canting angle is made variable and can be changed to fit the individual bicyclist's leg requirements. The cant plate spacer can be made of any suitably rigid material which can bear the forces exerted during bicycling without excessive distortion.

The desired canting angle can be established by means of a fixed cant plate spacer attachment to the sole of the bicycle shoe or it can form an integral part of the bicycle shoe cleat or shoe sole or can form an integral part of the pedal surface that supports the bicycle shoe or can be established by a bicycle shoe insole insert.

Embodiments of the present invention can include numerous devices which change the angle of the bicyclist's foot relative to the bicycle pedal bar axis thus placing the bicyclist's foot in an optimum position for the application of force to the pedal during bicycling. The key advantage of these embodiments is that of providing a means for the bicyclist to apply maximum force through corrected and natural alignment of his legs and feet to the bicycle pedals.

In accordance with the present invention, a method and apparatus is provided whereby:

a bicyclist can preselect the angle between his foot sole and the pedal surface and, if necessary adjust it in small increments of angle, including, in particular, selecting cant plate spacers of various small incremental angles and stacking the selected cant plate spacers so that the rider can tailor the total cant plate spacer thickness to achieve a desired angle which is believed to maximize his own body dynamic and reduce power loss and fatigue in his legs during the action of bicycling that normally occur when the bicyclist's foot is positioned flat on the bicycle pedal as in standard bicycle shoe, shoe cleat and pedal designs;

an alternate embodiment of the present invention can be easily integrated into a bicycle shoe cleat such that the desired canting angle is part of the cleat design;

an alternate embodiment of the present invention can be easily integrated into a bicycle pedal such that the desired canting angle adjustment is an integral and adjustable part of the pedal design;

an alternate embodiment of the present invention can be easily integrated into the sole of a shoe where the desired or adjustable canting angle is part of the shoe sole design;

an alternate embodiment of the present invention can be easily integrated into the inside of a shoe by an inserted wedge which lies primarily in the area of the ball of the foot;

an alternate embodiment of the present invention can be easily integrated with boots and skis used in cross-country skiing, with boots used in speed skating and roller-blading, and in all other sporting activities which normally require a fixed foot position which is flat and unnatural; and a bicyclist can utilize cant plate spacer shapes which match profiles commonly used in bicycling shoes, cleats and pedal designs.

Still further aspects and advantages will become apparent from a consideration of the following description and accompanying drawings.

BRIEF DESCRIPTION OF THE DRAWINGS

FIG. 9b is a top view of the shoe outer sole of FIG. 9a.

FIG. 11b is a bottom view of the pedal of FIG. 11a.

DETAILED DESCRIPTION

Figure 1:
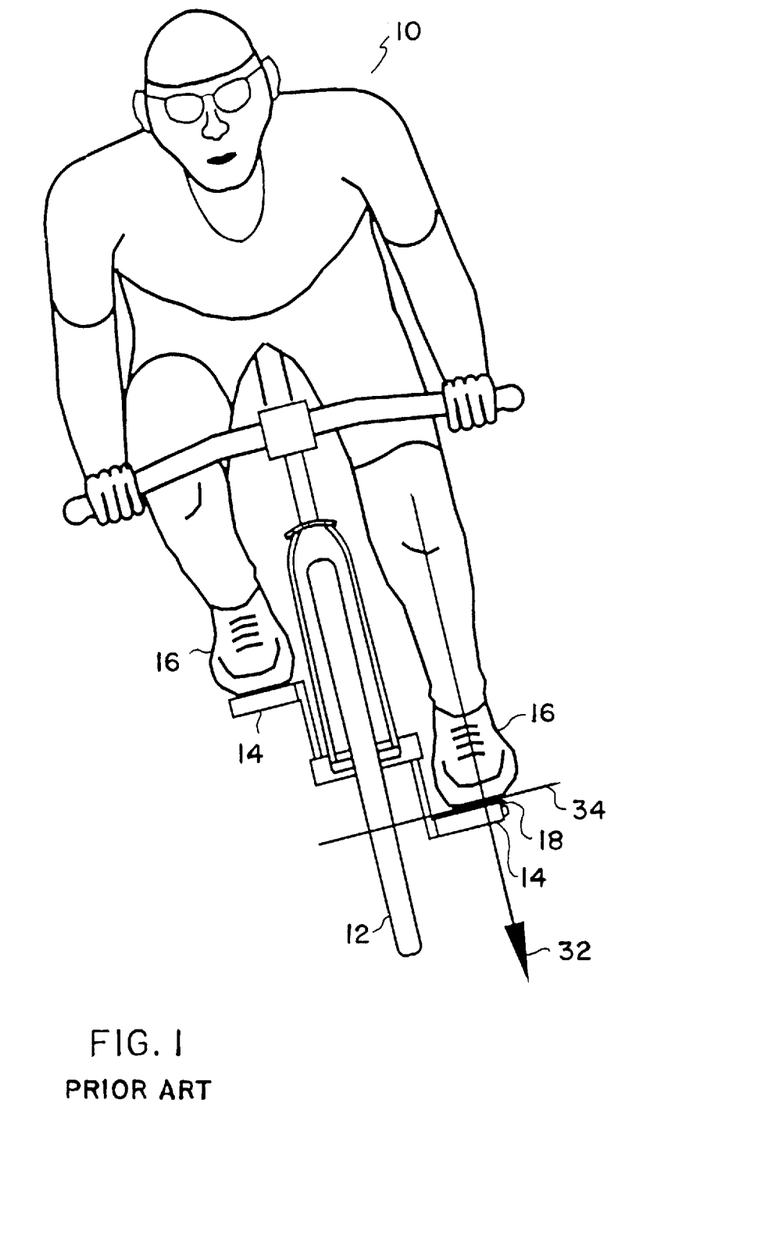
FIG. 1 shows a bicyclist riding a bicycle in accordance with the prior art.

Referring to FIG. 1, typical bicyclist 10 is shown riding bicycle 12. Bicycle 12 has pedals 14 which are propelled in the common manner by bicyclist 10 wearing shoes 16. While shoes 16 can contact pedals 14 directly, many bicyclists utilize cleat 18 to help engage and remain in contact with the pedals.

As can be seen in FIG. 1, pedals 14 are typically situated with respect to the frame of bicycle 12 such that a force applied by the feet to the pedal 14 is in a desired direction 32 and is perpendicular to a plane 34 of pedal 14 at the ball of the foot.

Figure 2:
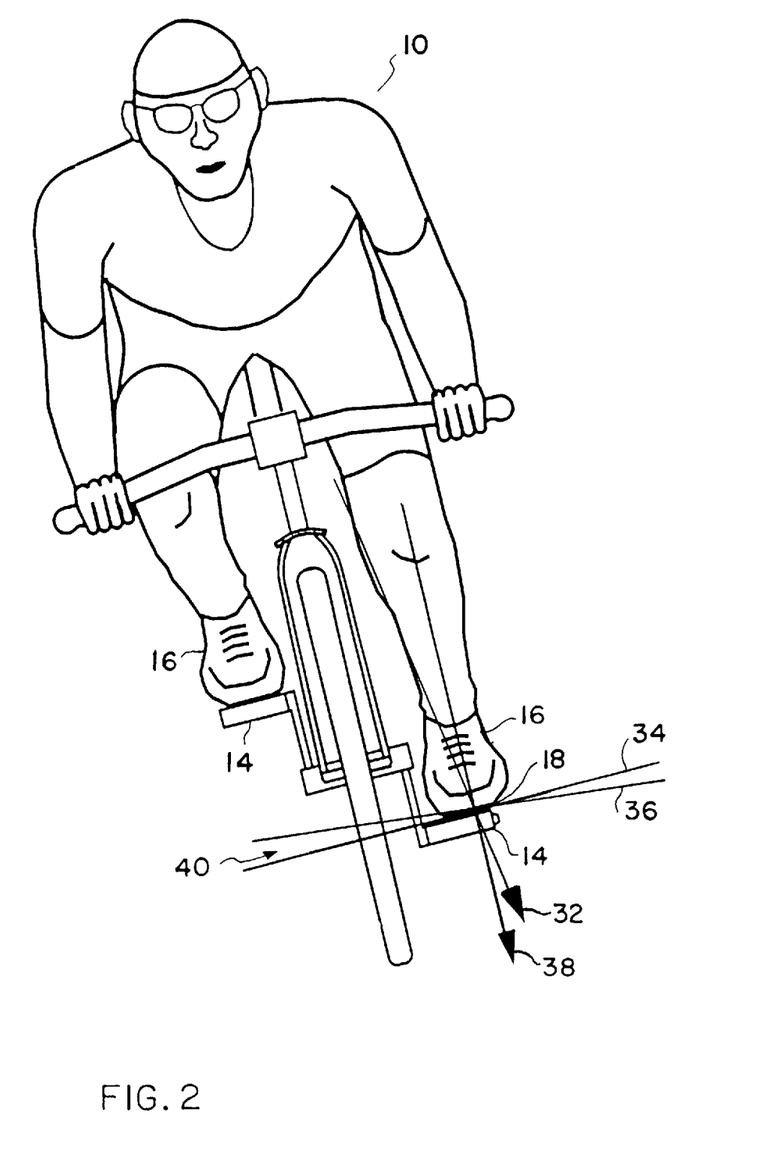
FIG. 2 shows a bicyclist riding a bicycle in a manner which implements the present invention.
Figure 3A:
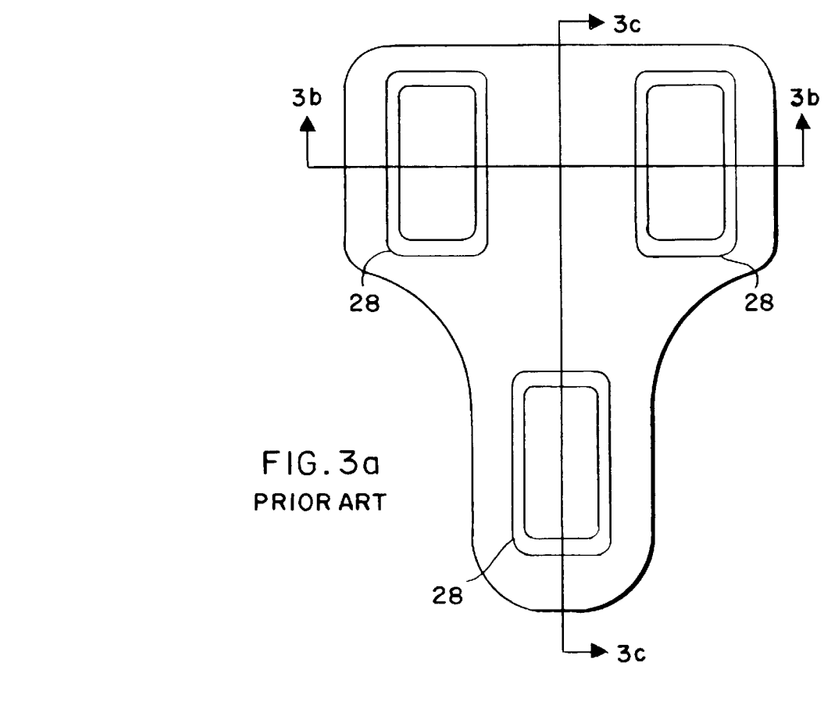
FIGS. 3a, 3b, and 3c show three views of a typical cleat.
Figure 3B:
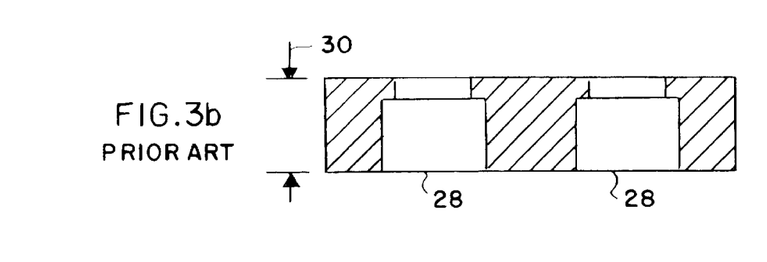
Figure 3C:
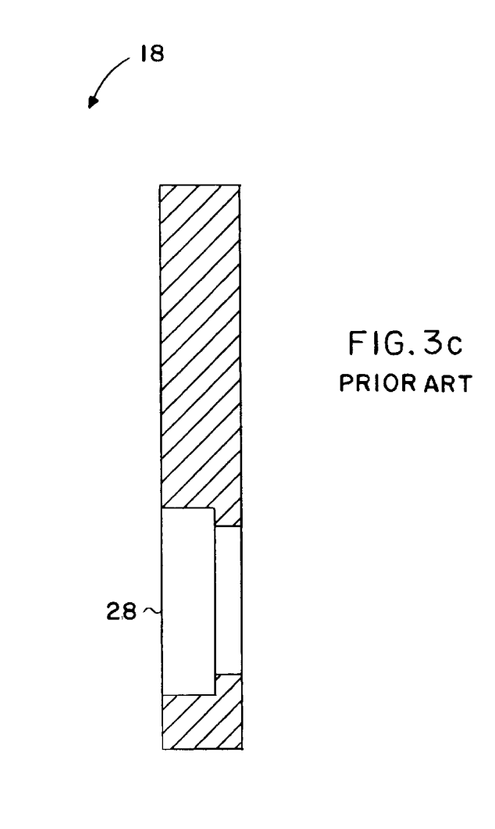

As discussed above, for the feet to be in their natural position, it is preferred that the sole of the feet (i.e., a plane at the ball of the feet perpendicular to the desired direction of power being applied by the foot) be canted or angled such that the inside of the foot is higher than the outside. Referring to FIG. 2, there is shown bicyclist 10, wherein such a preferred natural position for the bicyclist 10 is where the force applied by the feet to the pedal 14 is in a desired direction 38 rather than in a desired direction 32, desired direction 38 being perpendicular to a plane 36 at the ball of the foot, which is at an angle 40 to plane 34. This desired direction is facilitated by the angling of the pedal, bearing surface, cleat, internal dimensions of the shoe and/or the addition of spacers all as described further herein.

Referring to FIGS. 3a, 3b, 3c, and FIG. 4, shoe 16 has threaded holes 20 located in the shoe sole 22. Cleat 18 is affixed to shoe sole 22 using screws 24 and washers 26 which seat in recesses 28 of shoe sole 22. Cleat 18 typically has a generally uniform thickness 30. This is apparent from the cross sections taken along lines B—B and A—A of FIG. 3a and shown in FIGS. 3b and 3c, respectively. The cleat 18, shoe 16 and means of attachment 20, 24, 26 shown in FIG. 1 are well known to those skilled in the art.

Figure 4:
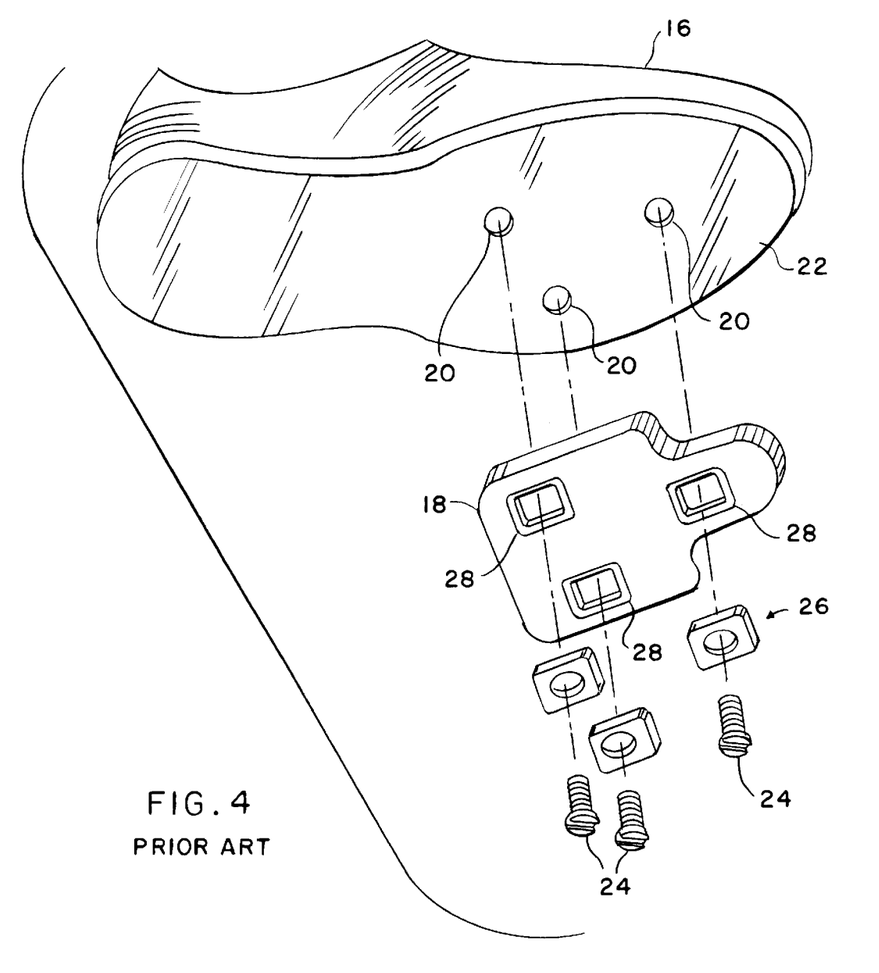
FIG. 4 is an exploded perspective view showing the attachment of the cleat of FIG. 3a to a shoe.
Figure 5:
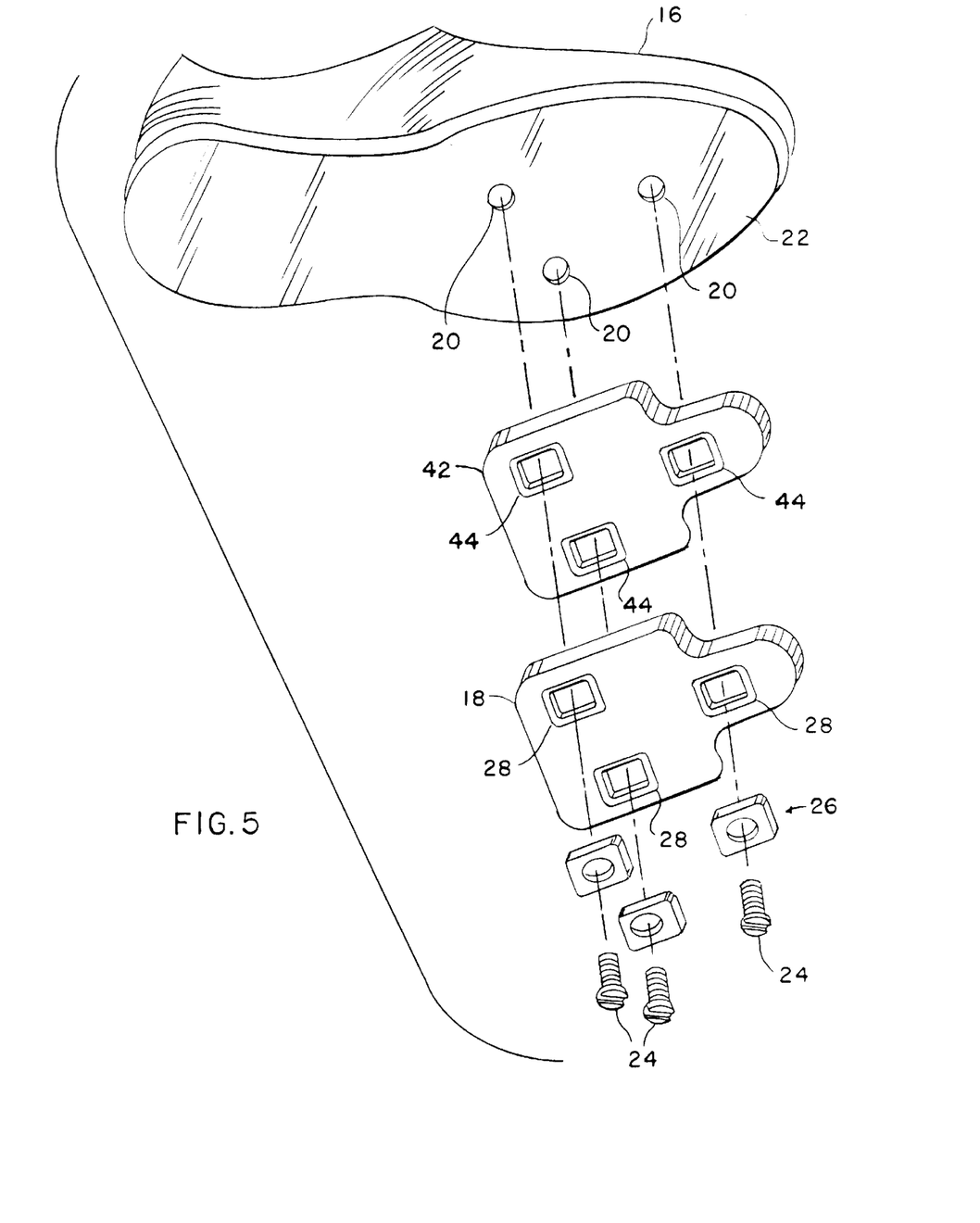
FIG. 5 is an exploded perspective view showing the attachment of the cant plate spacer of the present invention between a cleat and a shoe.
Figure 6A:
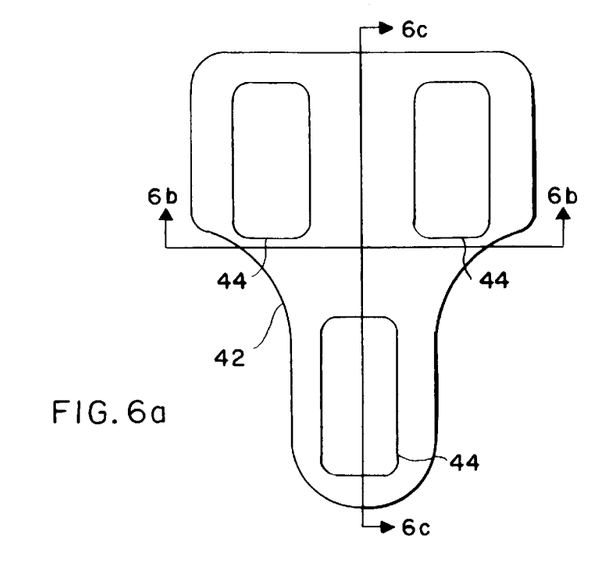
FIGS. 6a, 6b and 6c show three views of a cant plate spacer embodiment of the present invention.
Figures 6B, 12:
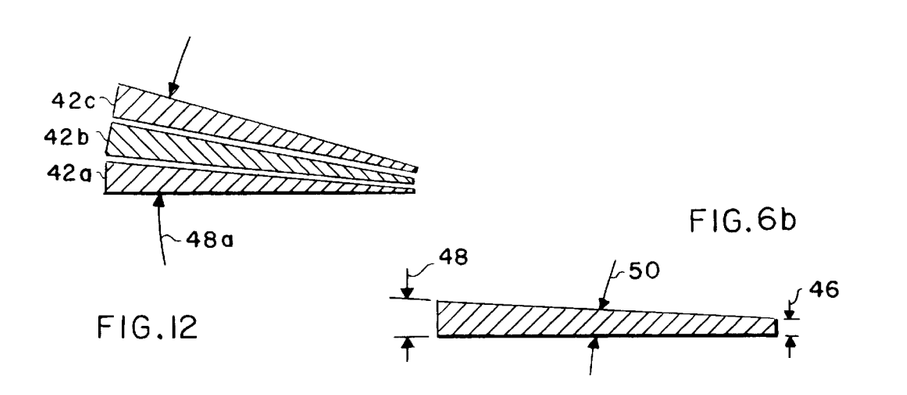
FIG. 12 shows an alternate embodiment of the present invention wherein a plurality of cant plate spacers are stacked to implement an accumulated canting angle.
Figure 6C:
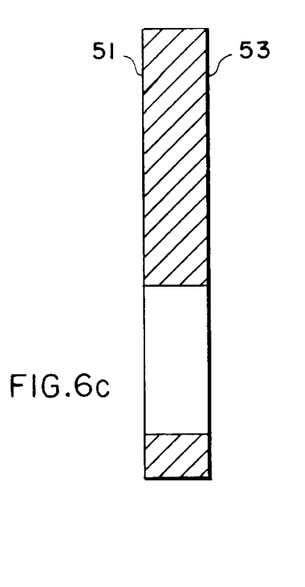

In accordance with one embodiment of the present invention, referring to FIGS. 5 and 6, cant plate spacer 42, having holes 44, is affixed between cleat 18 and sole 22 of shoe 16. Cleat 18 and cant plate spacer 42 are affixed to shoe sole 22 using screws 24 and washers 26. These seat in recesses 28 of shoe sole 22 by passing through holes 28 and 44 of the cleat 18 and cant plate spacer 42, respectively. Of note is that cant plate spacer 42 has the same general exterior shape and size as that of cleat 18. However, as can be seen in FIG. 6b, which is taken along line B—B of FIG. 6a, the thickness of cant plate spacer 42 tapers from a small dimension 46 to a larger dimension 48, the taper producing a canting angle 50. The larger dimension is placed near the inside of the foot to cant the inside portion of the foot upwardly. The dimensions 46 and 48 are sized such that canting angle 50 is comparable or generally equal to angle 40 as shown in FIG. 4 when cleat 18 is engaged with pedal 14. As can also be seen from FIG. 6c taken along line A—A of FIG. 6a, the thickness of cant plate spacer 42 is generally constant in the longitudinal, lengthwise direction of the foot.

The cant plate spacer 42 would be made of a relatively solid material capable of maintaining the canting angle while having a high enough coefficient of friction so that it will not slip or move once positioned between cleat 18 and shoe 16. One material of which cant plate spacer 42 might be made is a urethane type of sticky plastic. In a preferred embodiment, the material from which the cant plate spacer 42 is made would consist of polyurethene 80 durameter, with a serrated or uneven finish to provide a good mating surface. The rise producing the canting would typically be greater than 0 millimeters. The preferred range appears to be, but is not necessarily, between about 0.3 to about 7 millimeters. Referring further to FIG. 6, surfaces 51 and 53 may be roughened or applied with suitable adhesive to facilitate it firmly gripping the sole 22 of the bicycle shoe and the surface of the cleat.

When cant plate spacer 42 is inserted between the cleat 18 and shoe 16 in this manner, shoe 16, when engaged to pedal 14, allows the foot to be in a more natural position which is believed to thereby allow the bicyclist to apply maximum force through his legs and feet to the bicycle pedals. When the foot is in its natural position bicycle pedaling becomes easier, faster and with less strain as compared with current pedal/cleat/shoe systems. As a result, it is believed that more power can be applied to the pedal because the foot is not unnaturally twisted. This is accomplished because the cant plate spacer 42 is specifically affixed such that the provided canting angle is at the point where power is applied by the foot to the pedal 14, namely at the ball of the foot. Also, with the cant plate spacers 42 in place, knee wobble is reduced to either nothing or practically nothing which indicates that the alignment has occurred.

Figures 7A, 7B:
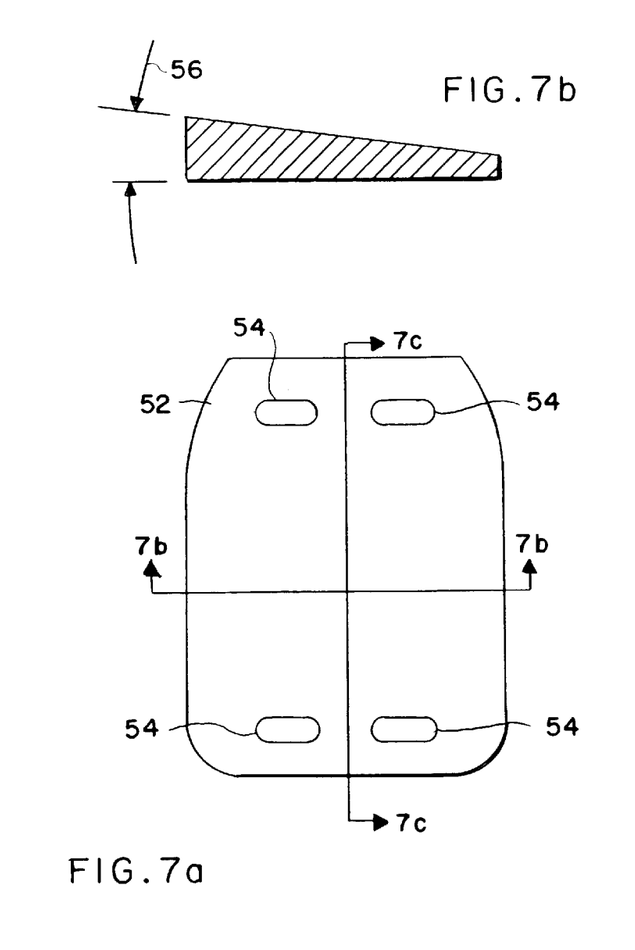
FIGS. 7a, 7b and 7c show three views of an alternate cant plate spacer embodiment of the present invention.
Figure 7C:
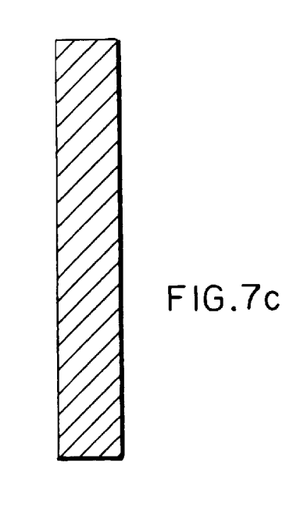

Of course, those skilled in the art can appreciate that cleats 18 and their corresponding cant plate spacers 42 can take a variety of forms and configurations. As an example, referring to FIG. 7a, cant plate spacer 52, has a more rectangular form. It includes four elongated holes 54. As in the previous embodiment and as shown in FIG. 7b, the cross sectional view taken along line B—B of FIG. 7a, tapers to establish canting angle 56. The cross-sectional view taken along line B—B of cant plate spacer 52, is taken in the direction of the latitudinal axis, or width of cant plate spacer 52. The cross sectional view of FIG. 7a, shown in FIG. 7c, and taken along line A—A is taken along the longitudinal, or lengthwise axis of cant plate spacer 52. Here, the thickness of the cant plate spacer 52 is generally constant. Cant plate spacer 52 is also to be inserted between a cleat 18 and a shoe sole 22 in a similar manner as that shown in FIG. 5. The canting angle 56 provides the comparable angle 40 when the cleat 18 is engaged with the pedal 14.

Figure 8A:
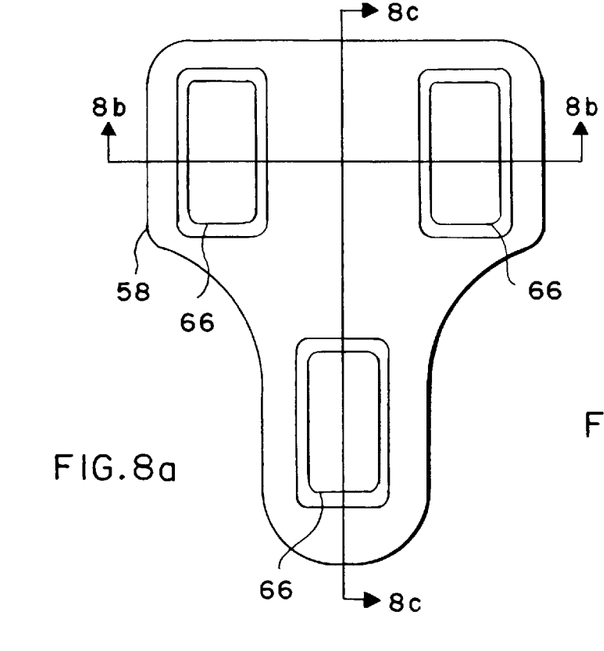
FIGS. 8a, 8b, and 8c show three views of an alternate embodiment of the present invention wherein a cleat implements a canting angle.
Figure 8B:
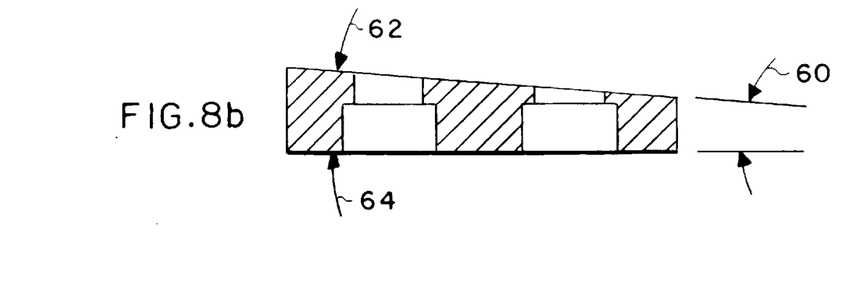
Figure 8C:
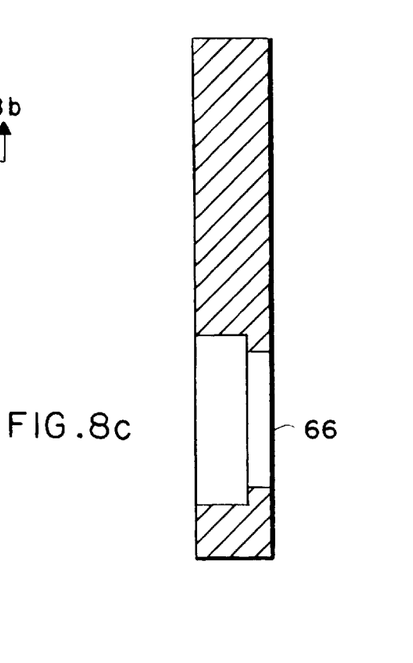

FIGS. 8a, 8b, and 8c illustrate a top and two sectional views, respectively, of a further embodiment for a cleat 58. The canting angle 60 is established by surfaces 62 and 64. Cleat 58 is attached to the bicycle shoe sole 22 by screws and washers which are inserted through the three slots 66. In effect, the cant plate spacer 42, 52 of the earlier embodiments is built into the cleat 58 such that canting angle 60 provides the comparable angle 40 as discussed above, when the cleat 58 is attached directly to the shoe 18 and the cleat 58 is engaged with the pedal 16.

Optionally, within slots 66, there may be placed a rubber insert which protrudes out from the cleat base surface and will lie distal of the shoe sole 22. This is to avoid slippage of the shoe 16 during normal walking.

In the preceding embodiments, the cleat 18, 58, and spacers 42, 52 have all been shown in size and placement for the ball of the foot. It is also possible that these could extend generally along the entire length of the foot. In such a case, the longitudinal, or lengthwise and major axis of the device in cross section, would be generally constant in thickness. The latitudinal cross section of the device, that is the minor axis or width, would be tapered. This would cause the inside portion of the foot to be urged upwardly. This taper would be generally constant along the length of the device.

In the preceding embodiments, the openings for receipt of the screws are seen to be generally elongated to enable the adjustable positioning of the cleats 18, 58 and spacers 42, 52 with respect to each other and/or with respect to shoe sole 22. Although threaded attachment of parts is shown, other means of engagement are contemplated. As an example, sole 22, cleat 18 and spacers 42, 52 might slidably engage one another and either might also slidably engage shoe sole 22. Alternatively, these elements might clip together.

The foregoing embodiments have discussed canting devices which may be attached to the sole 22 of a bicycle shoe 16. It is also possible to have canting plates which attach to the sole of a normal shoe. Further, while the foregoing embodiments have discussed canting devices 42, 52, 58 which may be attached to the sole 22 of the shoe 16, it is also possible to have a canting device for insertion into the shoe. This device would be inserted in the ball of the foot area. Alternatively, the canting device could ultimately extend flexibly along the entire foot length. If the canting device is inserted inside the shoe, the device would be more of a prosthetic device and would be made of typical prosthetic materials. These are usually plastics, leather, rubber and other known materials. Along these lines, it is also possible to include a shoe that has a tapered thicknesses under the footpad or built into the sole 22 to produce the canting angle.

Figure 9A:
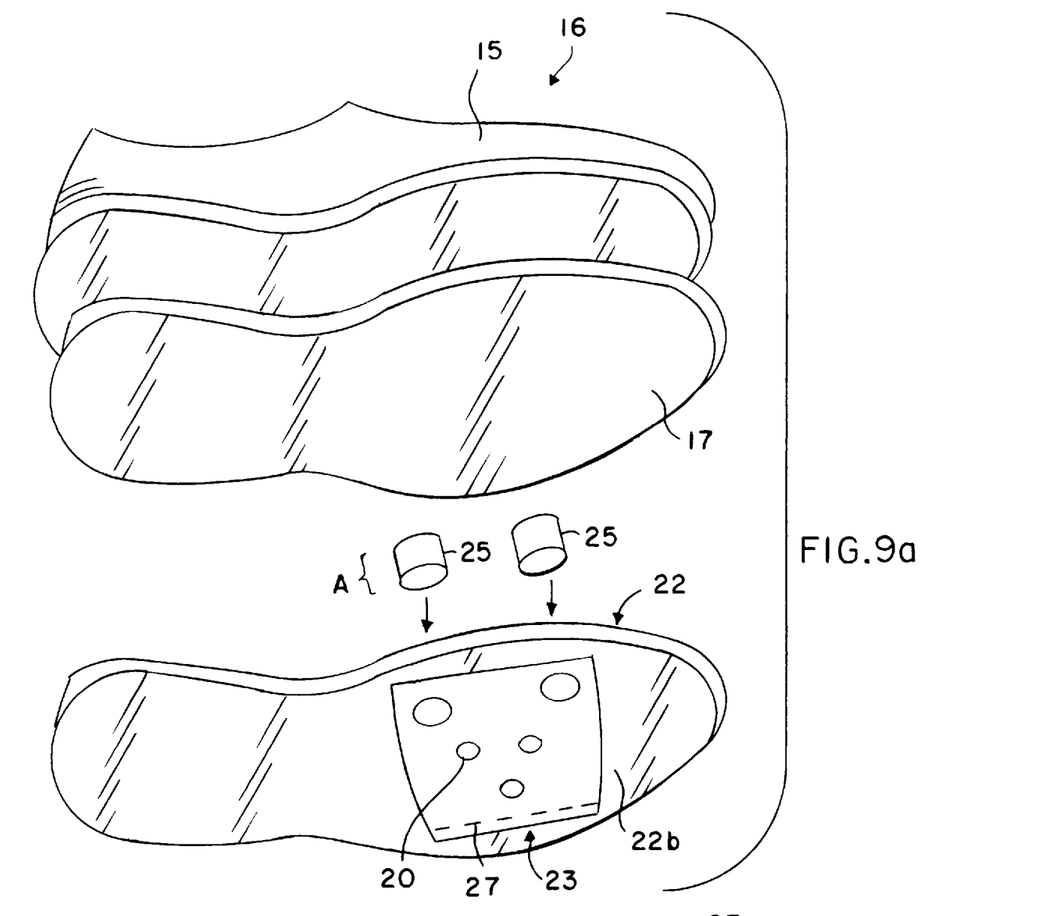
FIG. 9a is an exploded perspective view of a shoe, shoe insole, and she outer sole, where the bottom of the shoe outer sole has a hinged portion for canting the foot.
Figure 9B:
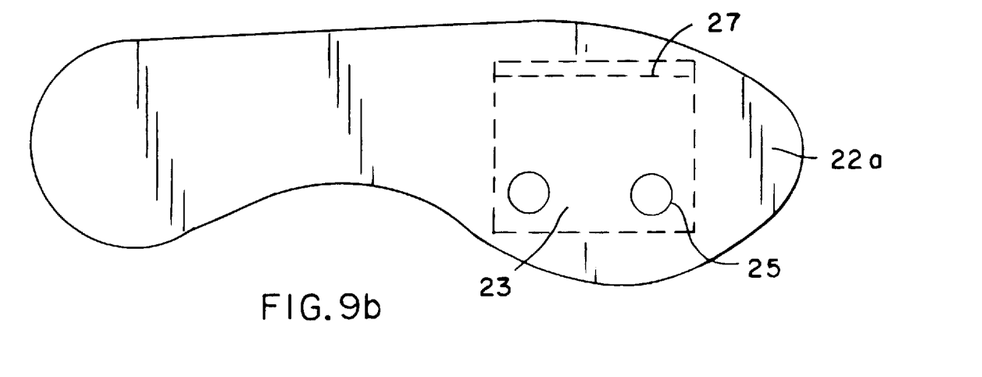

Instead of cant plate spacers, the sole 22 of shoe 16, can be manufactured with a plate 23 which adjustably angles away from sole 22 to wedge or cant the inside of the foot upwardly. Such an alternative is seen in FIGS. 9a and 9b. In FIG. 9a, upper portion 15 carries inner sole 17 which lies atop top surface 22a of shoe outer sole 22. The bottom surface 22b of outer sole 22, distal from inner sole 17, has defined therein a plate 23 for adjustably canting shoe 16. Plate 23 is hingedly or pivotally connected within outer sole 22 in the area of the outside portion of shoe 16. The hinge 27 connecting hinge plate 23 to outer sole 22 is shown in dashed lines in both FIGS. 9a and 9b and extends along the length of one end of plate 23. It is not visible from top surface 22a or bottom surface 22b. Plate 23 is defined in the area where threaded holes 22 are or could be placed for attachment to a cleat 18.

As can be seen in FIG. 9b, top surface 22a of outer sole 22 is comprised of a solid piece of material into which are fitted biasing devices 25 for biasing plate 23 into a wedged or canted position with respect to bottom surface 22b. In FIGS. 9a and 9b, the biasing devices are plate screws 25 having a length "A" that is generally equivalent to the width "A" of outer sole 22. A longer screw could be used for greater canting. This would, of course, preclude adjusting plate 23 to a position that is flush with bottom surface 22b as discussed further.

Plate screws 25 cooperate with threaded openings in top surface 22a to push against that end of plate 23 which is opposite hinge 27. When plate 23 is flush with bottom surface 22b, plate screws 25 are flush with top surface 22a. However, if plate 23 is to be pivoted away from bottom surface 22b, plate screws 25 must be turned to lie recessed from top surface 22a. This cants the inside side of shoe 16 upwardly. Adjustment of the canting angle is accomplished by turning plate screws 25 so that plate 23 is angled to a greater or lesser degree from bottom surface 22b.

Plate 23 may include additional biasing devices to cause it to be biased toward the bottom of outer sole 22 when plate screws 25 are turned to a position that is flush with the top surface 22a. Or, it may include threaded plate screw 25 receiving portions so that turning plate screws 25 either clockwise or counter clockwise will affect the movement of plate 23 with respect to bottom surface 22b. To the extent that pivoting plate 23 away from the bottom surface 22b of outer sole 22, might leave an open gap where debris could gather, side walls, stiff or foldable, would be included on plate 23 to prevent such. In use, one would lift inner sole 17, adjust plate 23 by turning plate screws 25, and achieve a canting of shoe 16.

Figure 10:
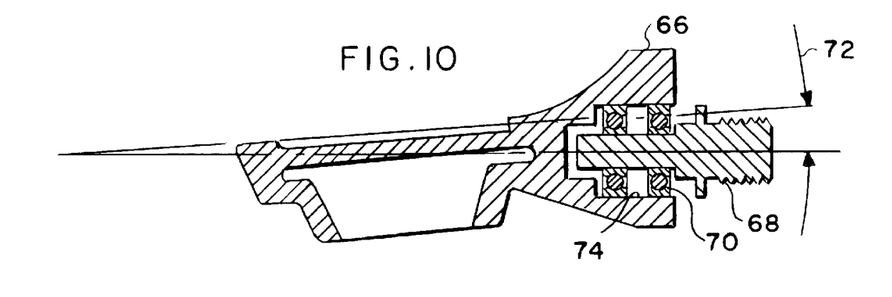
FIG. 10 shows an alternate embodiment of the present invention wherein a bicycle pedal implements a canting angle.

FIG. 10 is a sectional view of a standard bicycle pedal 66 taken along the longitudinal or major axis of spindle 68 for connecting the pedal 66 to the bicycle crank. Support bearings 70 are positioned at canting angle 72 to the plane of the pedal 66 through spindle 68 by machining the bearing support surfaces 74 in pedal 66 at the desired angle. The bearing support surfaces 74 can be machined at any desired angle to suit individual bicyclist's canting requirements. Alternatively, the bearing support surface 74 may be left uncanted but instead additional room may be left in the spindle bearing cavity 76 such that wedges, such as shims, could be inserted to variably alter the cant angle 72. Alternatively, variously internally canted sleeves could be interchangeably placed in bearing cavity 76 to change the bearing support surface 74 upon which the bearings 70 and the spindle 68 rest. As a yet different alternative, below each support bearing 70 there may be an adjustment screw connected to a surface. The screw would be accessible to the outside of pedal 66 for elevating certain support bearings 70 to change the cant angle 72 at which the spindle 68 is positioned in pedal 66. The goal here is to adjust the cant angle 72 of the pedal 66 rather than or in addition to any adjustment already made to shoe 16. In this regard, other means of making that adjustment are possible as long as the ultimate result is to cause the bicycler's foot to cant and lie in a natural position, with the inside of the foot being higher than the outside.

A further example of such means could be a canted pedal 66, which may be used in lieu of a standard pedal. The pedal 66 would be angled to position the inside of the foot higher than the outside. This could be done by manufacturing the pedal 66 surface with a thickened or wedged section. Alternatively, attachable wedges that are hollow or solid, could be made for connection to or in lieu of standard pedals 66.

Figure 11A:
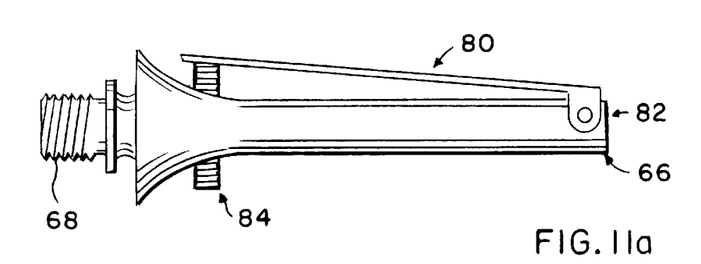
FIG. 11a is a diagrammatic side view of a modified foot pedal wherein the upper surface thereof is adjustably mounted.

FIG. 11a offers a further alternative. There, is shown a side view of a pedal 66 which surrounds in part a spindle 68 and includes mating surface 80. For ease of discussion, that portion of pedal 66 which surrounds spindle 68 will be referred to as "jacket 66". Mating surface 80 is pivotally attached by pivot 82 to the outside end of the jacket 66, distal from the sprocket of a bicycle, (not shown). It is threadably attached by a screw 84 to the inside end of the jacket 66, proximal to the sprocket. By turning screw 84, mating surface 80 may be raised or lowered with respect to the upper surface of jacket 66. Since mating surface 80 is pivotally attached to the outside end of jacket 66, adjustment of screw 84 will affect the cant angle of the foot placed on mating surface 80.

Figure 11B:
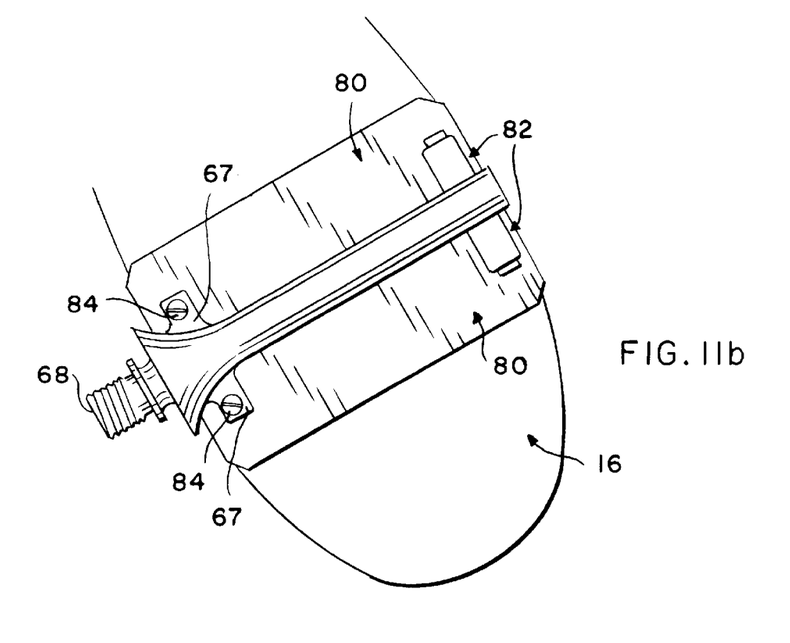

In the bottom view of this embodiment shown in FIG. 11b, two screws 84 are used to further facilitate the fine tuning of the cant angle of mating surface 80 with respect to jacket 66. These screws 84 attach to jacket 66 by means of support surface 67. In this regard, pivot 82 is seen to extend beyond the width of jacket 66 to provide good support for the mating surface 80. It is possible that the pivot 82 could contain a central ball joint so that one side of the mating surface 80 could be adjusted higher than the other. Alternatively, the pivot 32 could be centrally located as to the end of mating surface 80 and the end of jacket 66 and not extend beyond the width of jacket 66. This would facilitate varied adjustments between the two screws 84. It is also conceivable that the adjustments of screws 84 are linked so that adjustment of one results in adjustment of the other. In this situation, both sides of mating surface 80 would be held equidistant from jacket 66 at all times.

Although the descriptions above contain many specificities, these should not be construed as limiting the scope of the invention but as merely providing illustrations of some of the presently preferred embodiments of this invention. Various other embodiments and ramifications are possible within its scope. For example, the cant plate spacer 42, 52 can be made of other strong, lightweight materials, such as aluminum, titanium, steel, fiber reinforced composites or plastics which minimize the weight of the cant plate spacer. The material should be a suitable light weight rigid material that can carry the loads generated on it during cycling without unacceptable distortion. Mating grooves on the surfaces of the cant plate spacer 42, 52 and shoe sole 22 and/or cleat 18, 58 can be provided to prevent slippage. Multiple cant plate spacers could be stacked together to obtain a preferred canting angle. This may be seen in FIG. 12. There, cant plate spacers 42a, 42b and 42c form an accumulative canting angle 48a. One could select cant plate spacers 42a, 42b, and 42c of various incremental angles and stack them together to achieve a specific angle. This enables one to vary the cant from foot to foot. The embodiment of the cleat 58 with a built-in surface angle could be an adjustable cleat such that the canting angle is adjusted by, for example, an adjustment screw to raise and lower the canting angle to get the optimum angle for that individual. This could apply to any of the other embodiments as well. Any of the foregoing cant angle adjustment devices can be used separately or in combination with each other.

In summary, canting of the foot, as taught herein, can be achieved in numerous ways. Some of those considered ways include varying the wedge angle through the use of individual slatted inserts attached to a shoe sole 22 or used in connection with a bicycle pedal 16. Alternatively, or in addition, the angle of the foot may be varied by adjustment means that may be selectively adjusted to define different angles with relation to the shoe sole 22 or pedal 16. The desired angle of the foot may also be adjusted by the insertion of a bicycle shoe insert into or attached to the shoe sole, the insert covering the shoe sole 22 of the cyclist and made of a suitable stiff material to maintain the desired wedge angle during cycling.

While the embodiments of the invention described above have been described in conjunction with a bicycle shoe 16 and pedal 18, 58, 66, those skilled in the art can appreciate that the canting angle effect can be helpful in other situations where force is applied by the foot while maintaining the foot in a fixed position, for example, in cross-country skiing. Similar canting angle devices might be included for boots and ski interfaces used in cross-country skiing, or for use in any other sports activity which maintains the foot in a fixed position unnatural to its most relaxed position. All of the above embodiments when used for bicycling, are designed for pedals that do or do not use toe clips and straps. In any embodiment where attachment and connecting devices are described, such as screws, hinges, pivots, biases, etc. other equally effective parts may be used without departing from the invention. The canting devices have generally been described as solid. Hollow devices are also possible as long as they are constructed to withstand the loads placed upon them. There are modifications and variations of the present invention which are obvious to those of ordinary skill in the art in light of this description. It is understood that such modifications and variations are within the scope of the present invention.

Figures 13A, 13B, 13C:
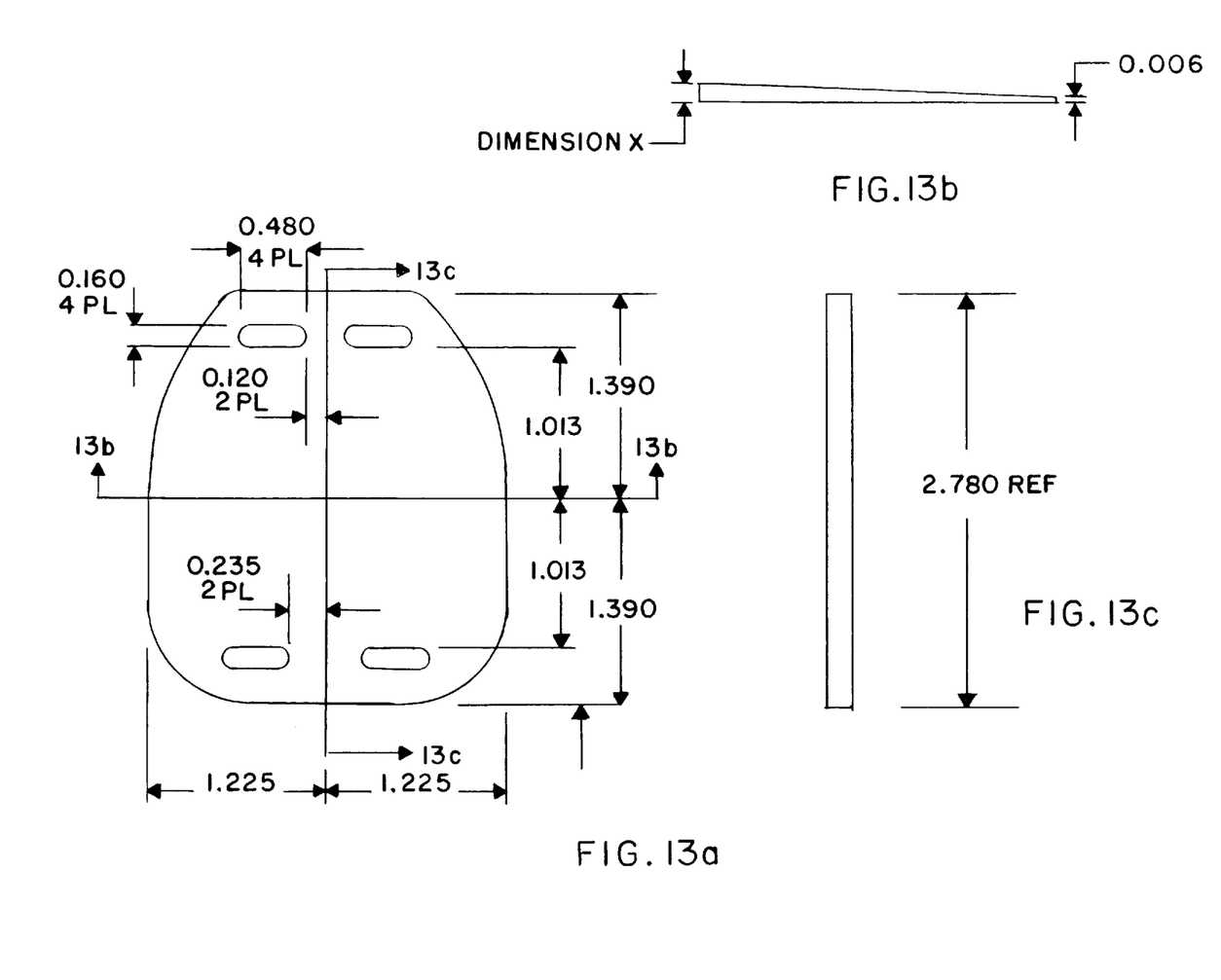
FIGS. 13a, 13b, 13c, 14a, 14b, 14c, 15a, 15b, 15c are diagrammatic views of the invention with specific measurements written therein to enable the manufacture of one example of the invention. Other dimensions are within the contemplation of this invention.
Figure 14A:
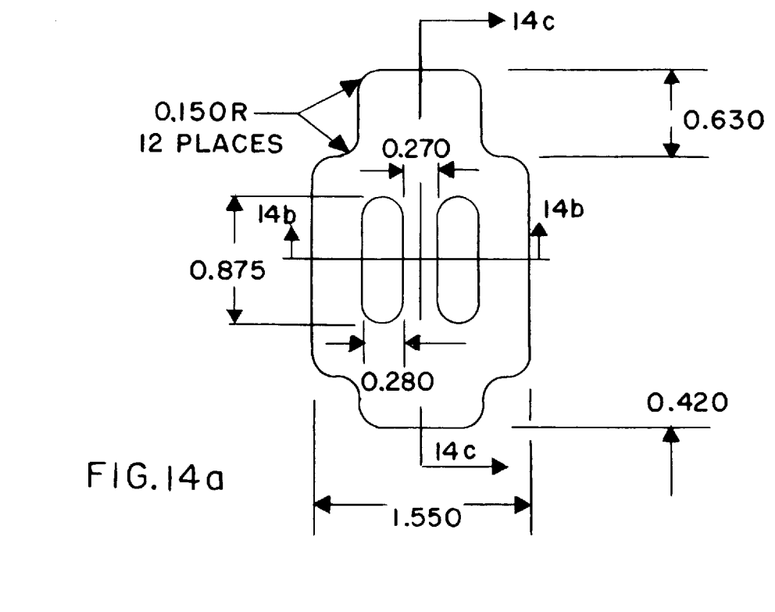
Figure 14B:
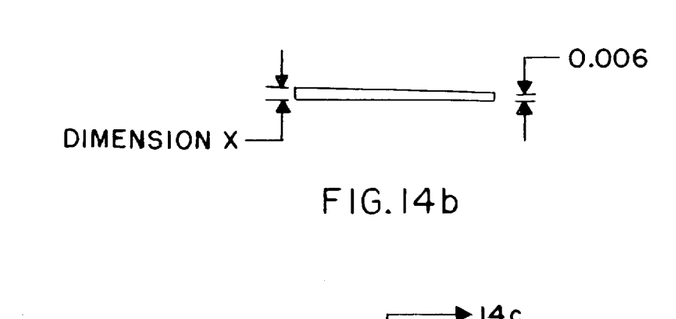
Figure 14C:
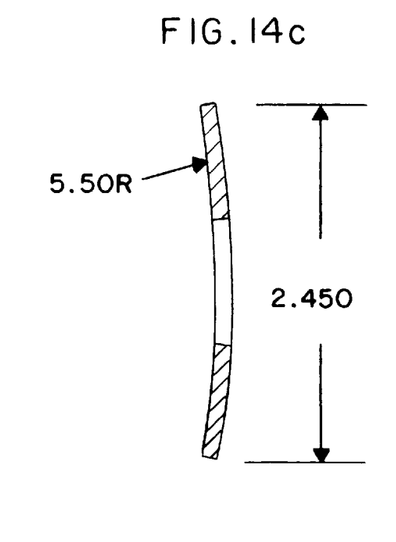
Figure 15A:
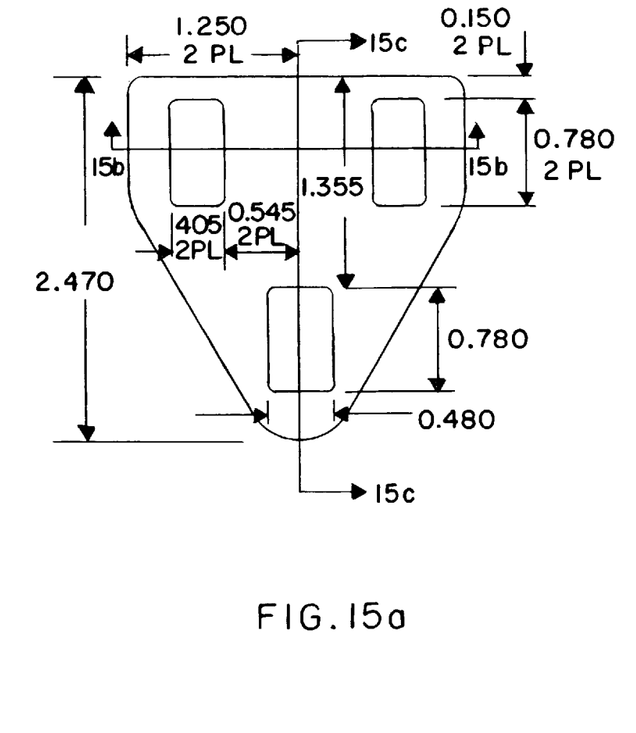
Figure 15B:
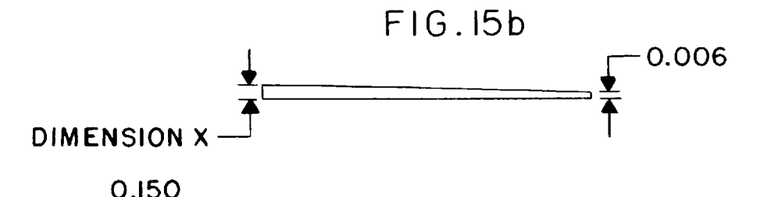
Figure 15C:
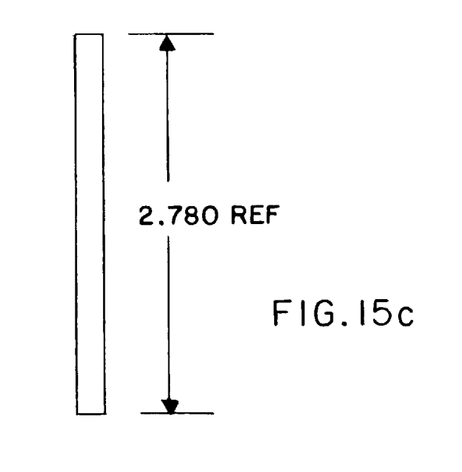

One set of specific examples of wedges or canted spacers 42, 52 and cleat 58 with a built in cant is shown in FIGS. 13a, 13b, 13c, 14a, 14b, 14c, 15a, 15b, 15c. Measurements are in inches. Tolerances are 0.005 inches. No flashing is allowed on molded edges of wedge. In these figures, the letters "PL" refer to "places" and indicate how many places a dimension is repeated in the drawing. In FIGS. 13a, 13b, 13c, 15a, 15b, and 15c fillet radius is to be 0.003/0.006 U.O.S. In FIG. 13b, DIMENSION X may be 0.038, 0.071, or 0.135 inches. In FIG. 14b, DIMENSION X may be 0.026, 0.046 or 0.086 inches. In FIG. 15b, DIMENSION X may be 0.038, 0.071 or 0.135 inches. These figures merely show one example of the present invention and are not intended as a limitation thereof.

What is claimed is:

1. A method for adjusting a physical body alignment between a foot applying muscle power and a pedal for receiving applied muscle power, the muscle power being applied in a desired direction perpendicular to a plane at the ball of the foot, the plane at the ball of the foot having a longitudinal axis, the method comprising the step of:

inserting a cant spacer having a tapered thickness between a shoe covering the foot and the pedal, the spacer being placed in an area proximate the ball of the foot and not in areas proximate a heel of the foot.

2. The method of claim 1, wherein the step of inserting the cant spacer includes the step of disposing the cant spacer between a shoe covering the foot and a cleat for coupling the shoe to the pedal.

3. The method of claim 1 wherein the cant spacer inserted between a shoe covering the foot and the pedal includes a plurality of cant plate spacers stacked together, each cant plate spacer having a tapered thickness, an accumulated tapered thickness resulting from the tapered thickness of each cant plate spacer and providing a canting angle about the longitudinal axis of the plane at the ball of the foot applying power with respect to the plane through the pedal.

4. The method of claim 2 wherein the cant spacer inserted between a shoe covering the foot and the cleat includes a plurality of cant plate spacers stacked together, each cant plate spacer having a tapered thickness, an accumulated tapered thickness resulting from the tapered thickness of each cant plate spacer and providing a canting angle about the longitudinal axis of the plane at the ball of the foot applying power with respect to the plane through the pedal.

5. The method of claim 1 wherein the cant spacer inserted between a shoe covering the foot and the pedal is made of a urethane noncompressible material, the thickest portion of the cant spacer being between about 0.3 to about 7 millimeters.

6. The method of claim 4 wherein the cant plate spacers inserted between a shoe covering the foot and the cleat are made of a urethane noncompressible material, the thickest portion of each cant plate spacer being between about 0.3 to about 7 millimeters.

7. The method of claim 1 wherein the cant plate spacer includes a cleat for insertion between a shoe covering the ball of the foot applying muscle power and the mobile object for receiving applied muscle power, the cleat having a tapered thickness, the tapered thickness providing a canting angle about the longitudinal axis of the plane at the ball of the foot applying power with respect to the plane through the mobile object for receiving applied muscle power.

8. An apparatus for adjusting a physical body alignment between a foot applying muscle power and a pedal for receiving applied muscle power, the muscle power being applied in a desired direction perpendicular to a plane at the ball of the foot, the plane at the ball of the foot having a longitudinal axis, the apparatus comprising:

a cant spacer having a tapered thickness, the cant spacer disposed between a shoe covering the foot and the pedal in an area near the ball of the foot and not in areas near a heel of the foot.

9. The apparatus of claim 8, wherein the cant spacer includes a cant plate spacer disposed between a shoe covering the foot applying muscle power and a cleat for coupling the shoe to the pedal, the cant plate spacer having a tapered thickness, the tapered thickness providing a canting angle about the longitudinal axis of the plane at the ball of the foot applying power with respect to the plane through the pedal.

10. The apparatus of claim 9, wherein the cant plate spacer is made of a urethane noncompressible material, the thickest portion of the cant plate space being between about 0.3 to about 7 millimeters.

11. The apparatus of claim 8 wherein the cant spacer includes one or more cant plate spacers stacked together between a shoe covering the foot applying muscle power and the pedal, each cant plate spacer having a tapered thickness, an accumulated tapered thickness resulting from the tapered thickness of each cant plate spacer and providing a canting angle about the longitudinal axis of the plane at the ball of the foot applying power with respect to the plane through the pedal.

12. The apparatus of claim 11 wherein the cant spacer is disposed between the shoe and a cleat for coupling the shoe to the pedal.

13. The apparatus of claim 8 wherein the cant spacer includes a cleat for coupling the shoe to the pedal.

* * * * *